United States Patent [19]

Saurenman et al.

[11] 4,383,354
[45] May 17, 1983

[54] METHOD OF FORMING AN INTERLOCKING METAL JOINT

[76] Inventors: Phillip E. Saurenman, 3438 Vosburg St.; William A. Casler, 3487 Barhite St., both of, Pasadena, Calif. 91107

[21] Appl. No.: 256,718

[22] Filed: Apr. 23, 1981

[51] Int. Cl.³ .................... B21D 39/00; B23P 11/00
[52] U.S. Cl. .............................. 29/522 R; 29/524; 138/166
[58] Field of Search .............. 29/521, 524, 522 R; 138/166, 170, 162

[56] References Cited

U.S. PATENT DOCUMENTS

| | | | |
|---|---|---|---|
| 578,801 | 3/1897 | Wilmot | 29/521 X |
| 2,330,207 | 9/1943 | England et al. | 29/521 UX |
| 2,762,117 | 9/1956 | Houck | 29/521 |
| 2,860,540 | 11/1958 | Karlsson | 29/522 R X |
| 3,004,326 | 10/1961 | Merz | 29/522 R X |
| 3,094,197 | 6/1963 | Attwood | 29/522 R X |
| 3,099,238 | 7/1963 | Jones | 29/524 X |
| 3,273,601 | 9/1966 | De Gain | 138/166 |

Primary Examiner—Charlie T. Moon
Attorney, Agent, or Firm—Donald D. Mon

[57] ABSTRACT

A metal structure such as a tube having an axial seam formed with interlocked tongues and recesses with in-plane stabilization created by locally moving areas of the metal out of plane to form dimple-like structures ("dimples") either before or after forming the tongues and recesses. After the tongues and recesses are interengaged, the dimples are flattened to cause the out-of-plane metal to return to the plane so that the metal adjacent to them is moved strongly laterally, and the walls of the tongues and recesses make a strong abutting fit against one another which resists relative out-of-plane displacement, thus providing "in plane" stabilization.

9 Claims, 16 Drawing Figures

U.S. Patent  May 17, 1983  Sheet 1 of 3  4,383,354
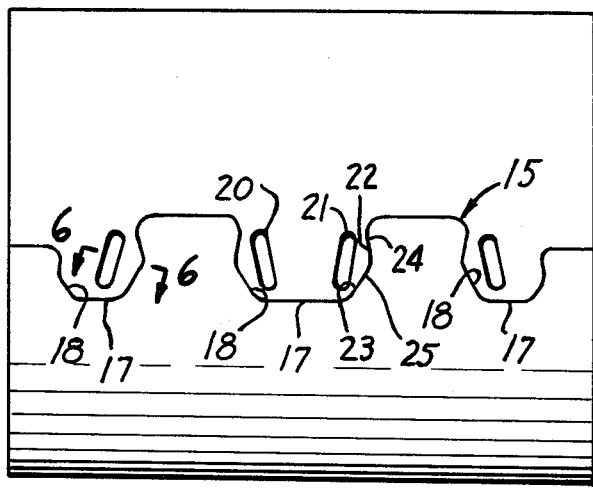
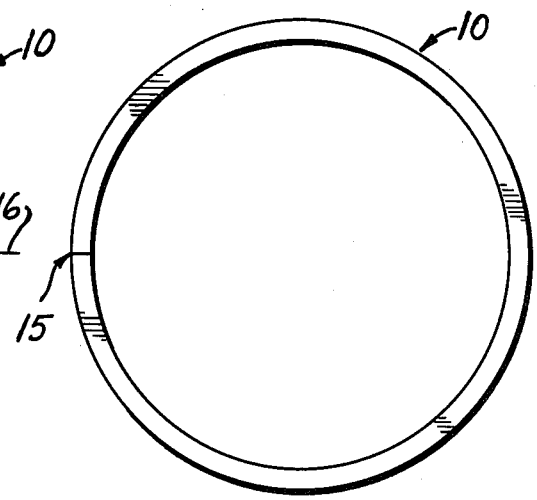
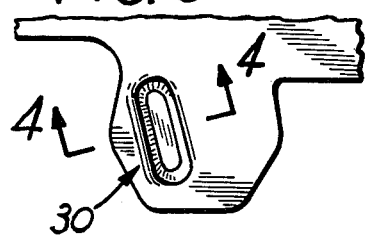
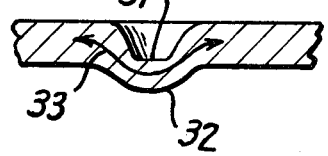
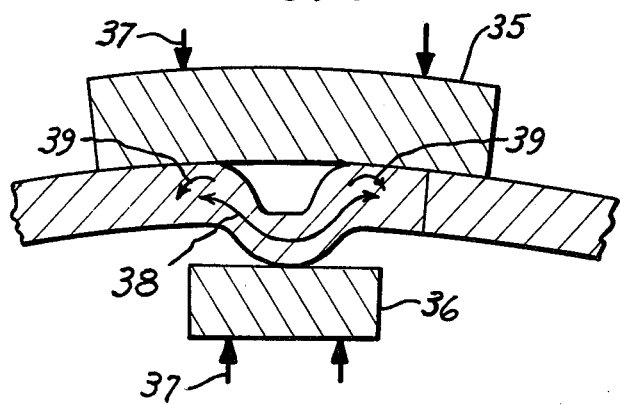

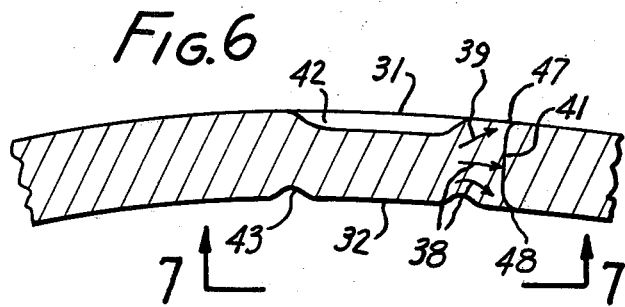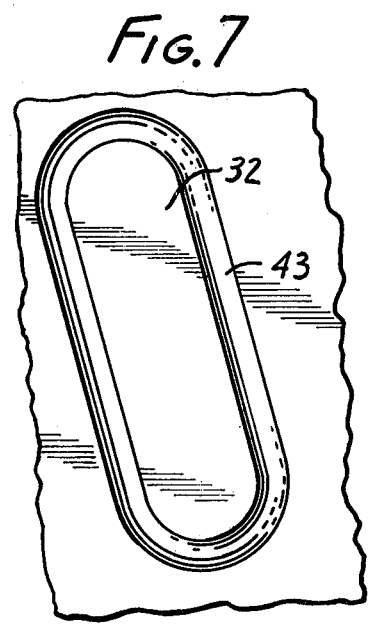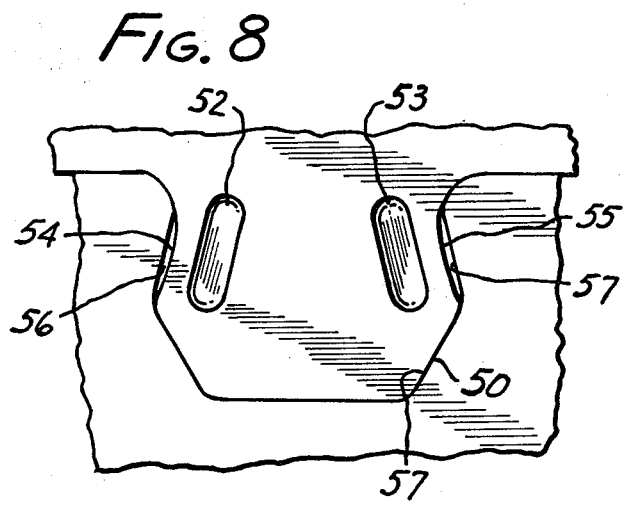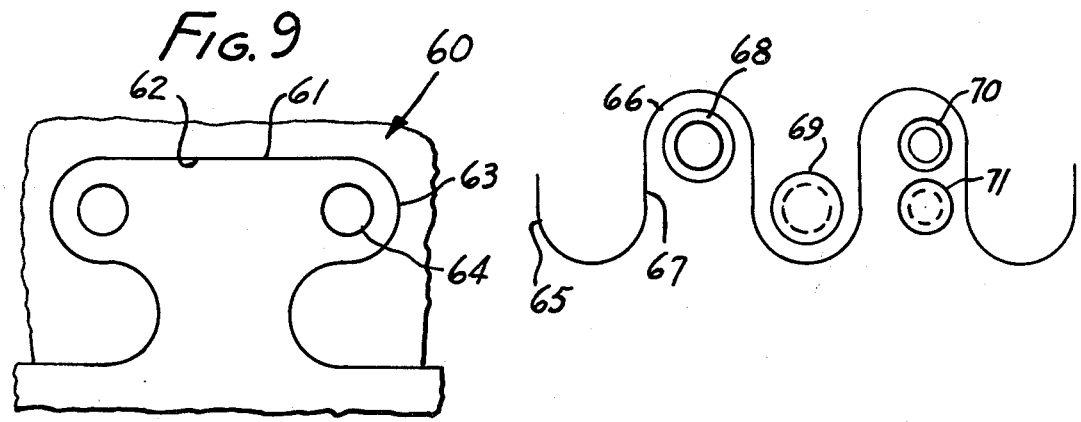

METHOD OF FORMING AN INTERLOCKING METAL JOINT

FIELD OF THE INVENTION

This invention relates to the formation of interlocked metal seams in structures such as rings formed from sheet, plate, or strip stock to a ring structure.

BACKGROUND OF THE INVENTION

Interlocking joints in rings, cylinders, and other tubular structures are customarily assembled during or after the primary fabrication of the cylinder itself. Tangential forces tending toward in-plane separation of the joint are resisted by the interlocking geometry of the joint structure itself or by friction in simple tongue and groove structures. That is to say, this structure resists the direct pulling apart of the joint edges, and of course also any lateral in-plane movement. In addition, friction between the interlocked edges of the joint, along with the stiffness of the total structure, provides resistance against radial or out-of-plane displacement of the interlocked joint ends, even though there is no basic geometry which prohibits the out-of-plane dislodgement of the joint. This is to say, these frictional forces tend to discourage one seam edge from "popping out" relative to the other.

In thin wall structures, particularly those having a large diameter-to-thickness ratio, the joint friction and the structural stiffness are sometimes insufficient effectively to resist out-of-plane dislodgements of the joint when the structure encounters impact or crushing loads during transit or use. Also these out-of-plane joint dislodgement problems can further be aggravated by cut edges of the joint which are off-square, due to normal sheared edge geometries or due to breakdown of the edge corner during the engagement of the interlocking joint. These undesirable conditions further reduce the holding friction, and sometimes even provide a preferred direction of radial displacement ("dislodgement") under shock or crushing loads.

It is an object of this invention to provide means for strengthening the joint, particularly against radial or out-of-plane joint rupture, whereby a joint can be manufactured in an expedient and inexpensive rolling and stamping operation and with positive restraints in all three axes of movement relative to the plane in which the seam is formed.

BRIEF DESCRIPTION OF THE INVENTION

In this invention, a piece of metal has tongues and recesses, and is formed into a cylinder so the tongues engage in the recesses. An area of the metal at or adjacent to an edge of a tongue or recess is moved out-of-plane to form all or part of a dimple-like structure ("dimple"). After engagement of the tongues and recesses, the dimple is flattened, and its material is returned to the plane in a motion which includes at least some lateral movement of the metal. This causes the edges of the tongue and recess to be brought into a firm abutment, which provides in-plane reinforcement.

The dimple may be formed before or after the tongues and recesses are formed, or after the tongues and recesses are interengaged.

According to a preferred but optional feature of this invention the dimple is formed in the material before the tongues and recesses are cut, and at a spacing from where the edge of the material will be when it is cut.

The above and other features of this invention will be fully understood from the following detailed description and the accompanying drawings, in which:

BRIEF DESCRIPTION OF THE DRAWINGS

FIG. 1 shows a completed ring according to the invention;

FIG. 2 is an end view of FIG. 1;

FIG. 3 is a fragmentary plan view of a tongue with a dimple in it before flattening of the dimple;

FIG. 4 is a cross-section taken at line 4—4 in FIG. 3;

FIG. 5 shows the process of flattening the dimple of FIG. 3;

FIG. 6 is a fragmentary cross-section taken at line 6—6 in FIG. 1;

FIG. 7 is a fragmentary enlarged plan view taken at line 7—7 in FIG. 6;

FIG. 8 shows an intermediate step in an alternative process for making the ring;

FIGS. 9 and 10 are fragmentary plan views of other useful tongue, recess, and dimple constructions;

DETAILED DESCRIPTION OF THE DRAWINGS

Figure 11:
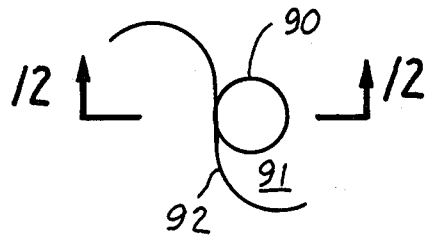
FIGS. 11, 13 and 15 are fragmentary plan views of other relationships between the dimple and a related edge of material.

In FIG. 1 there is shown a formed metal cylinder 10. The example given is a metal cylinder having a wall thickness of approximately ⅛", a diameter of approximately 2½" and a length of approximately 3". It is suitable for the stator ring of a conventional electric motor, and can conveniently be made of low carbon steel. Such steel is customarily obtained in plate, strip, or coil form, and in this invention it is formed to a cylinder.

The object of this invention is to provide an improved seam 15 which will more securely hold the ring in its assembled condition, and in particular give support to the edges of the seam against dislodgement out of its plane.

For purposes of this invention, "the plane" referred to is that of FIG. 1. One direction (or axis) of reinforcement is horizontally in FIG. 1 parallel to axis 16 of the ring (axial reinforcement). The other is perpendicular to the seam in the plane (tangential reinforcement), and resistance along these directions is provided by the geometry of the seam itself.

The seam has one or more tongues 17 and recesses 18. It will be noticed that these are frequently complementary to one another so that a tongue can enter and interengage in a respective recess. In fact, the same die frequently will have sheared both ends of the metal which will be formed to make the ring. A customary cut-off die with appropriate contour is suitable for this purpose. The tongues and recesses are usually designed to resist both tangential and axial in-plane joint displacement.

Another direction (axis) of separation is out-of-plane, i.e., radially apart normal to the plane, and may also be thought of as a radial or out-of-plane separation. This type of separation is normally resisted by the frictional forces exerted on the abutting boundaries of the tongues and recesses and by the inherent tendency of the ring to retain its formed shape. Of course there may be some tendency of the ring material to spring back, and this is principally resisted in prior art constructions by the friction. It follows that increasing the friction is beneficial to retention of the ring shape and stabilization of the seam. Any means which can cause an action reinforcing the in-plane stability and resisting out-of-plane dislodgement is to be desired, and that is provided by means of this invention.

In order to accomplish this invention, dimple-like structures ("dimples") are formed in local regions of the metal. Their general shape is best shown in FIGS. 3 and 4. For longer seam edges, the dimples are preferably lozenge-shaped and alongside or near some relatively straight edge portion of a tongue or recess.

The dimples, however shaped, constitute local regions of metal which have been moved out-of-plane. An ultimate objective is to attain enhanced frictional and in-plane locking engagement along a substantial length of material, and therefore the shape and location of the dimples will be selected in accordance with the effect desired as dictated by the shape of the tongue or recess. As will later be shown, shapes other than lozenges can be used, for example circular, dome-shaped dimples.

It will be noted here that both edges (i.e. abutting ends of the bent strip) may be considered as having tongues and recesses, or there may be only one of either on a respective edge, depending on the geometry (and on the terminology). The shapes are complementary, and a portion which enters a recess in the other part is for convenience referred to as a tongue. In order to provide for best retention, a re-entrant shape of tongue and recess is preferably provided. This is to say that a pair of recess edges such as edges 22, 23 are formed which are abutted by tongue edges 24, 25 respectively. These form a key-type engagement to restrain against axial and tangential in-plane forces at the seam edge.

The presently preferred technique for forming the dimples is to form them before the material is slit to make the tongues and grooves. Because the desired locality of the dimples is known, and the locality will later be discussed in detail, they can with this preferred technique be formed at any time prior to the actual shearing of the stock to form the edges. This has the advantage that, when the tongues and recesses are interengaged there is an initial nearly net fit all along the edge of the seam. When the dimple is flattened out, then the metal which will be displaced sidewardly will make an appreciably tighter "interference" type fit with the edge that it abuts.

It is also possible to form the tongues and grooves before forming the dimples and even to form the cylinder and interengage the tongues and recesses before forming the dimples, and the consequences of so doing will later be discussed.

The terms "cylinder, " "ring" and "tube" are used interchangeably herein. The term "flattening" as used for the dimples is used in a sense of coining or ironing of the joint assembly. This will customarily be accomplished by the final forming load in a conventional press or other metal forming machine.

The preferred shape of dimple 30 is shown in FIGS. 1, 3 and 4. It is lozenge-shaped with a somewhat flattened bottom 31 on the concave side, and with a generally loaf-shaped surface 32 on the convex side. A substantial area of metal is moved out-of-plane, i.e., it is shifted away from the face of the metal. In consequence, the metal is somewhat thinned, and it also is drawn to form a longer "path" from edge to edge as shown by arrow 33 in FIG. 4. The metal along this path has inherent stiffness, and also is bent.

When the seam is to be completed, then as shown in FIG. 5, a pair of forming bodies 35, 36 are brought against the faces to compress the dimple back into plane. This causes force fields as shown by arrows 37, 38 and 39. Force 37 causes some crushing action to return the metal to the plane. Force 38 causes lateral movement at the tongue edges. Force 39 causes a lifting torque at the edge.

The consequences of forces 37, 38 and 39 are best shown in FIGS. 6 and 7. Edge walls 40 and 41 have been forced together very strongly. Surfaces 31 and 32 have been generally flattened, and are surrounded by ring-like depressions 42, 43. Of course the dimpled material never returns precisely to where it was drawn from, and the redistribution of material has important consequences. For example, note in FIG. 6 the curvatures 47, 48 at the edges of walls 40 and 41. This reshaping of the edge walls is the consequence of forces 38 and 39, and provides a type of "key-lock" against edge displacement which adds to the frictional effect in resisting radial out-of-plane separation. This "key-lock" effect is achieved by forcing the dimpled edge into the characteristic non-square geometry of the other cut metal edge.

When the dimple is formed before the tongues and recesses are cut, there will be an initial net fit of the tongue and recess when the joint is assembled, and the displacement of the metal when the dimple is flattened will add interference to the existing net fit. This gives the best results, but is not a limitation on the invention. For example, FIG. 8 shows in a schematic and exaggerated way an intermediate condition when the dimple is formed *after* the tongues and recesses are formed, either before or after the ring is formed and the tongues and recesses are interengaged.

In FIG. 8, tongue 50 is shown interengaged in recess 51. Dimples 52, 53 have been formed *after* the tongues and recesses were formed. The result is a slight "drawing back" of material at tongue edges 54, 55 so as to leave gaps 56, 57 between the edges of the tongue and groove. Of course these gaps are exaggerated for purposes of illustration. In fact, they may hardly be visible. However, it will not be the same net fit as if the dimple had been made before forming the tongues and recesses. Dimensions will be selected such that the dimple, when flattened, will cause sufficient movement to close this gap, and provide a tight fit, but it will not be as strong as the construction when the dimple is formed before the tongues and recesses are formed. Still, it is a useful product, and the dimple can be formed either before or after the ring is formed. The drawing back of material referred to above can be minimized or avoided by adding some bottom-thinning to the dimple-drawing operation, thus further thinning and displacing material from the dimple's central area and thereby reducing or reversing the tendency to draw material away from the normal cut edge line of the tongue. Of course, in every embodiment, the dimple is flattened only after the ring is formed and tongues and grooves are interengaged.

FIG. 9 shows a joint 60 where the tongues 61 and recesses 62 are severely re-entrant, and have lobes 63. In such a construction a circular dimple 64 is most advantageous in all lobes, because it tends to follow the edge of the tongue.

FIG. 10 shows a serpentine shaped joint 65 with tongues 66 and recesses 67 that are generally rounded.

Again, a circular dimple 68 is preferred, because it provides a dimple perimeter which generally follows the shape of the tongue edge.

In fact, in all embodiments, the dimple shape is preferably selected so that the dimple edge generally follows the tongue edge. This improves the edge interference when the dimple is flattened.

Product features characteristic of the two-stage out-of-plane/in-plane reforming seam lock process include the existence on the surface of the finished seam structure of not only the remains of the main depression on the originally convex side of the dimple but also a slightly depressed perimeter around the dimple area on its originally convex side. This distinctive depressed perimeter is the result of the reversals in stretching, bending and compression resulting from raising and then compressively flattening the spherical or elongated dome-shaped dimples. These reversals in bending also provide the preferred joint edge rotation during flattening so that the originally concave dimpled side of the edge of the metal advances more forcefully into its same side of the mating joint edge.

Use of this metal-rotation/edge bias feature makes it possible to add to the friction a keyed-type of restraint against out-of-plane displacements of the joint or seam. This can be done for example by opposing a seam's existing bias due to normal metal shear and/or joint assembly operations—this initial bias providing a preferred direction of joint out-of-plane disengagement which is then countered by the selected direction of rotation of the dimpled side of the seam. Or where intrinsic bias due to shear or assembly is not significant, this key-lock effect can be achieved by providing multiple dimple lock structures formed above and below the plane of the metal on one side of the seam, or formed on each side of the seam but on one side of the metal; in either case this achieves the positive edge-bias restraints against out-of-plane displacements in either direction. In FIG. 10 to achieve the two way restraint against out-of-plane displacement downward dimple 68 on one side of the seam cooperates with the upward dimple 69 on the other side of the seam; and in the alternate arrangement depicted in FIG. 10, the dimple 70 cooperates with the dimple 71, both on the same side of the seam.

It should be noted in FIG. 10 that seam 65 is not of the generally preferred and stronger interlock-type geometry (which of course requires special out-of-plane joint assembly techniques), but is interdigitated and not locking. This indicates the applicability of this invention to non-locking type tongue and groove structures. It also highlights the fact that the disclosed dimple-reform techniques to obtain interference engagements at the seam edge cannot only increase out-of-plane joint strength, but can also add significantly to the pull strength of a mechanical seam. In fact, multiple dimple arrangements such as shown in FIG. 10 generate in a non-locking joint interfacing or "stitch" type positive restraints against pull separation comparable in effectiveness to a locking type joint geometry.

This invention is not limited by the thickness of metal, or to any particular shape or size of joint fingers—except, of course, that the relationship between metal thickness and the height, width, shape and location of the dimples must be selected so that the final flattening operation produces the desired edge displacements and seam interference engagements (as opposed to just buckling the dimple, or simply ironing a deformed tooth back into its basic tooth geometry without benefit of the interference engagements at the seam).

In the techniques exemplified in FIGS. 5, 8 and 9, the dimple is shown as spaced from the edge of the tongue by an edge distance. The edge distance is of course related to the size of the dimple and the thickness of the material. If it is too large, then the lateral force which should be exerted at the edge may be lost in the material itself. Therefore the edge distance should not be too large. In fact, as shown in FIGS. 11 and 12, there need be no edge distance at all, although some will usually be desirable in order to "smooth out" the effect immediately at or near the tangent point.

Furthermore, it is possible for only part of a dimple to be provided, or for a dimple to be disposed partly on one side, and partly on the other side. In fact, it is possible, although not desirable, to provide only part of a dimple, and this on only one side.

Figure 12:
FIGS. 12, 14 and 16 are cross-sections taken respectively at lines 12—12, 14—14 and 16—16 in FIGS. 11, 13 and 15.

In FIGS. 11 and 12, dimple 90 is formed in tongue 91, tangent to edge 92.

Figure 13:
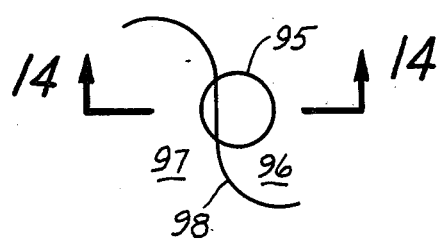
Figure 14:
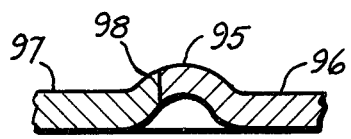

In FIGS. 13 and 14, dimple 95 is formed in tongue 96 and recess 97, extending across edge 98, with a larger portion of it on tongue 96 than on recess 97.

Figure 15:
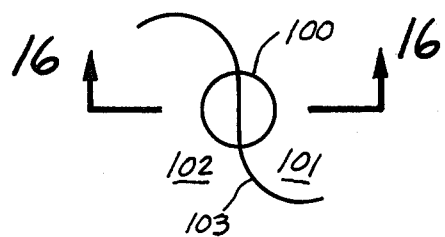
Figure 16:
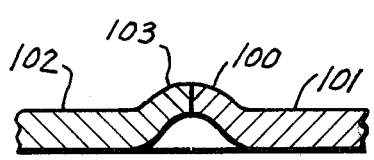

In FIGS. 15 and 16, dimple 100 is formed in tongue 101 and recess 102, across edge 103, the dimple being divided equally.

In FIGS. 11-16, it will be noted that in every case the dimple or portion of dimple is formed so that a downward pressure will exert not only a rotational effect, but also a lateral force which tends to move the edge laterally. Thus, the dimple is to be contrasted with a simple fold or bent tab, which is merely pressed flat. That does not exert a lateral force. The dimple is a raised, not a purely bent, structure, which when flattened undergoes interference which tends to move the material laterally. A complete dimple is not necessary, but the arrangement is not merely the flattening of a fold. Thus, the term "dimple" is not limited to a structure whose periphery is completely within the plane of the material.

The terms "plane" and "in-plane" as used herein are, of course, related to the curvature of the cylinder. The seam can be, but usually is not flat, but has the curvature of the remainder of the cylinder, and accordingly the terms are not strictly to be construed.

The term "interlocked" is not limited to structures in which the tongues are re-entrant as in FIGS. 1 and 9, but includes those such as shown in FIG. 10 where the tongues and recesses can slide directly in and out.

This invention is not to be limited by the embodiments shown in the drawings and described in the description, which are given by way of example and not of limitation but only in accordance with the scope of the appended claims.

We claim:

1. The method of forming an interlocking metal joint comprising:
   in a continuous piece of plate metal having a pair of opposite faces, forming a dimple raising one surface, recessing the opposite surface, and thinning the metal within the dimple so as to increase its path length compared to the plate metal, thereby resulting in a departure of a localized region from both of said faces, said dimple being entirely surrounded by undimpled material,
   forming a strip of said metal having opposite ends, one of said ends having a tongue including said dimple and the other having a recess, said tongue having said dimple therein and recess being congruent, each having a respective edge;

forming said strip of metal into a cylinder shape and interengaging said tongue having said dimple therein and recess in a subtantially common plane, whereby said tongue and groove precisely interfit; and after said interengagement, flattening said dimple toward said common plane, whereby to extend the respective edge into tight contiguity with an abutting edge.

2. The method of claim 1 in which a portion of said edge nearest to said dimple is linear, and in which said dimple is lozenge-shaped in the direction of said linear portion.

3. The method of claim 1 in which a portion of said edge nearest to said dimple is curved, and in which said dimple is a circular dome shape.

4. The method of claim 1 in which a dimple is formed in each of two tongues, the dimple in one tongue being displaced from the plane in the opposite direction from the dimple of the other tongue.

5. The method of claim 1 in which a pair of dimples are formed in one tongue, the dimples being displaced from the plane in opposite directions.

6. A method according to claim 1 in which the edge respective to the material containing said dimple is spaced from said dimple whereby the edges when interengaged are subtantially co-planar.

7. A method according to claim 1 in which the edge respective to the material containing said dimple is closely adjacent to said dimple.

8. A method according to claim 1 in which the edge passes through said dimple.

9. A method according to claim 1 in which said tongues and recesses are re-entrant.

* * * * *